United States Patent [19]

Kruper, Jr. et al.

[11] Patent Number: 4,500,704
[45] Date of Patent: Feb. 19, 1985

[54] CARBON DIOXIDE OXIRANE COPOLYMERS PREPARED USING DOUBLE METAL CYANIDE COMPLEXES

[75] Inventors: William J. Kruper, Jr.; Daniel J. Swart, both of Midland, Mich.

[73] Assignee: The Dow Chemical Company, Midland, Mich.

[21] Appl. No.: 523,217

[22] Filed: Aug. 15, 1983

[51] Int. Cl.$^3$ .............................................. C08G 63/62
[52] U.S. Cl. ..................................... 528/405; 528/370
[58] Field of Search ........................ 528/405, 370, 412

[56] References Cited

U.S. PATENT DOCUMENTS

| | | | |
|---|---|---|---|
| 3,278,457 | 10/1966 | Milgrom | 260/2 |
| 3,278,458 | 10/1966 | Belner | 260/2 |
| 3,278,459 | 10/1966 | Herold | 260/2 |
| 3,427,256 | 2/1969 | Milgrom | 252/431 |
| 3,427,334 | 2/1969 | Belner | 260/429 |
| 3,427,335 | 2/1969 | Herold | 260/429 |
| 3,585,168 | 6/1971 | Inoue et al. | 260/77.5 D |
| 3,699,079 | 10/1972 | Haynes | 260/47 EP |
| 3,706,713 | 12/1972 | Hull et al. | 260/77.5 D |
| 3,900,424 | 8/1975 | Inoue et al. | 252/428 |
| 3,953,168 | 4/1976 | Fabbri et al. | 8/178 R |
| 4,166,898 | 9/1979 | Kambe et al. | 528/405 |

FOREIGN PATENT DOCUMENTS 828523 2/1960 United Kingdom .

OTHER PUBLICATIONS

Inoue et al., "Copolymerization of Carbon Dioxide and Epoxide with Organometallic Compounds", Die Makromolekulare Chemie 130, 210–220, (1969).
Inoue et al., "Copolymerization of Carbon Dioxide with Optically Active Propylene Oxide", Polymer Journal 2, 220–224, (1971).
Inoue et al., "Synthesis and Thermal Degradation of Carbon Dioxide–Epoxide Copolymer", Applied Polymer Symposium, No. 26, 257–267, (1975), John Wiley.
Inoue, "Copolymerization of Carbon Dioxide", from "Progress in Polymer Science Japan", vol. 8, Wiley, 1975, pp. 1–42.
Inoue, "High Polymers from $CO_2$", Chem. Tech., Sep. 1976, pp. 588–594.
Herold et al., "Hexacyanometalate Salt Complexes as Catalysts for Epoxide Polymerizations", from Polymerization Kinetics and Technology, Plater, Ed., Adv. in Chem. Series 128, Am. Chem. Soc., Wash., D.C., 1973, pp. 208–229.
Kobayashi et al., Makromolecules 4, 658–9, (1971).
Kobayashi et al., Journal of Polymer Science: Polymer Chemistry Ed. 11, 2383, (1973).
Nishimura et al., Chem. Abstr. 91, 57840g, (1979).
Tokyo Institute of Technology, DerWent.

*Primary Examiner*—Earl A. Nielsen
*Attorney, Agent, or Firm*—Norman L. Sims

[57] ABSTRACT

The invention is a process for the preparation of a carbon dioxide oxirane copolymer wherein the process comprises contacting carbon dioxide with an oxirane in the presence of (1) an organic coordination compound and (2) a catalytic amount of a double metal cyanide complex under conditions such that an oxirane carbon dioxide copolymer is prepared.

22 Claims, No Drawings

CARBON DIOXIDE OXIRANE COPOLYMERS PREPARED USING DOUBLE METAL CYANIDE COMPLEXES

BACKGROUND OF THE INVENTION

This invention relates to a carbon dioxide oxirane copolymer and to a process for the preparation of such a copolymer.

Copolymers of oxiranes and carbon dioxide are useful in elastomers, adhesives and in films.

Inoue et al., *Applied Polymer Symposium* No. 26, pp. 257–267, John Wiley and Sons, Inc. (1975), disclose the copolymerization of an epoxide with carbon dioxide using organometallic catalyst systems under mild conditions, that is from atmospheric pressure to 50 atmospheres and from about 20° C. to 50° C. The catalyst is a mixture of a dialkyl zinc with a compound with two active hydrogens, for example, water, primary amines, dihydric phenols, aromatic dicarboxylic acids or aromatic hydroxy carboxylic acids. Other organometallic catalyst systems include dialkyl zinc coupled with sulfur, acetone, nitromethane and acetaldehyde.

Inoue et al., U.S. Pat. Nos. 3,585,168; 3,900,424; and 3,953,168, disclose a catalyst composition useful in the preparation of copolymers from carbon dioxide and oxiranes wherein the catalyst composition comprises the reaction product of (a) an organometallic compound having the general formula $R'_n M$, wherein n is an integer, at least one $R'$ is an alkyl group, an alicyclic group, or halogen or hydroxy or alkoxy radicals, or hydrogen, the remaining $R'$ groups are alkyl groups, alicyclic groups, alkaryl groups, aralkyl groups, aryl groups, or halogen or hydroxy or alkoxy radicals, and M is a metal of group II or group III of the Periodic Table; (b) a co-catalyst component which is sulfur or a compound containing active hydrogen atoms; and (c) carbon dioxide.

Haynes, U.S. Pat. No. 3,699,079, discloses a process for copolymerizing one or more diepoxide compounds with carbon dioxide in the presence of a catalytic amount of a composite catalyst comprising an organometallic compound of magnesium, zinc, or cadmium, and one or more compounds from the group of polar organic nitro-nitroso, azooxy, amine, thiol, and sulfoxide compounds and water.

The catalysts used in the processes described hereinbefore have significant disadvantages. These catalysts are expensive to prepare, sensitive to air, and pyrophoric.

What is needed is a process for the copolymerization of carbon dioxide and an oxirane in which the catalyst is less expensive than the prior art catalysts, which is relatively stable when exposed to air and which is not pyrophoric.

SUMMARY OF THE INVENTION

The invention is a process for the preparation of a carbon dioxide oxirane copolymer wherein the process comprises contacting carbon dioxide with an oxirane in the presence of (1) an organic coordination compound and (2) a catalytic amount of a double metal cyanide complex under conditions such that an oxirane carbon dioxide copolymer is prepared.

Another aspect of the invention is a carbon dioxide oxirane copolymer which has an average molecular weight of between 1,500 and 30,000, and a glass transition temperature of between −15° C. and 25° C.

The catalysts used in this process are less expensive than the prior art catalysts, reasonably stable when exposed to air, and are not pyrophoric.

DETAILED DESCRIPTION OF THE INVENTION

The carbon dioxide oxirane copolymer comprises ether repeating units and carbonate-ether repeating units arranged in random order. Ether repeating units comprise the residue of an oxirane which is an alkylene moiety bonded to the oxygen from the oxirane. The carbonate ether unit comprises a carbon dioxide moiety bonded to the residue of an oxirane which is an alkylene moiety bonded to the oxygen from the oxirane wherein the carbon dioxide moiety is bonded to the alkylene moiety.

The copolymer preferably contains between 50 and 95 mole percent of carbonate ether repeating units with the remainder being ether units. More preferably the copolymer contains between 70 and 95 mole percent carbonate-ether units.

The copolymer of this invention preferably corresponds to the formula

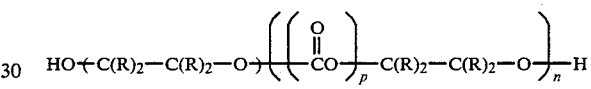

wherein

R is separately in each occurrence hydrogen, a halogen, a nitro group, a cyano group, a $C_{1-20}$ hydrocarbyl or a $C_{1-20}$ hydrocarbyl substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl or aralkylsulfonyl group; or two R's on adjacent carbon atoms may form a $C_{3-20}$ cycloaliphatic group;

p is separately in each occurrence the integer 0 or 1; and n is an integer of between about 10 and 460, inclusive.

Carbonate-ether monomer units generally correspond to the formula

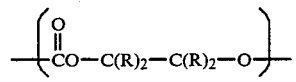

and ether units generally correspond to the formula

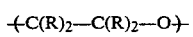

wherein R is as defined hereinbefore.

In the above formula it is preferable that p be 1 in between about 50 and 95 percent of its occurrences, and more preferably between about 70 and 95 percent.

The copolymers are generally flexible with elastomer properties. The average molecular weights of the copolymers are preferably between about 1,500 and 30,000, more preferably between about 10,000 and 25,000 and most preferably between about 18,000 and 24,000. The glass transition temperature of these copolymers is preferably between about −15° C. and 25° C., more preferably between about 0° C. and 15° C., and most preferably between about 6° C. and 10° C. The dispersity of these copolymers is preferably between about 2 and 6, and more preferably between about 2 and 3. Dispersity is $M_w/M_n$ wherein $M_w$ is the weight average molecular weight and $M_n$ is the number average molecular weight.

The copolymers are prepared by contacting carbon dioxide and an oxirane in the presence of a double metal cyanide complex and an organic coordination compound. One novel aspect of this invention is the use of the double metal cyanide as the catalyst for this copolymerization. The double metal cyanide complexes of this invention include those wherein one of the metals is chromium, manganese, iron, cobalt, zirconium, zinc, aluminum, sodium, potassium, calcium in the +2 or +3 valence state, vanadium, titanium in the +4, +5 or +6 valence state, molybdenum in the +2 to +6 valence state, or mixtures thereof; the other metal is palladium, platinum, chromium, manganese, iron, cobalt, rhodium, ruthenium, iridium, osmium, rhenium, nickel in the +2 or +3 valence state, vanadium, titanium in the +4, +5 or +6 valence state, molybdenum in the +2 to +6 valence state, or mixtures thereof.

The double metal cyanide complex includes those complexes which correspond to the formula $$(M^1)_a[M^2(CN)_b(X)_c]_d$$

wherein $M^1$ is chromium, manganese, iron, cobalt, zirconium, zinc, aluminum, sodium, potassium, calcium, vanadium, molybdenum, titanium or mixtures thereof;

$M^2$ is palladium, platinum, chromium, manganese, iron, cobalt, rhodium, ruthenium, iridium, osmium, rhenium, nickel, vanadium, titanium, molybdenum or mixtures thereof;

X is Cl, Br, I, F, $N_3$, SCN, OCN, an alkoxy or an alkoxycarbonyl group;

a is an integer of from 1 to 3 inclusive;
b is an integer of from 4 to 6 inclusive;
c is an integer of from 0 to 2 inclusive; and
d is an integer of from 1 to 3 inclusive.

$M^1$ is a metal ion that forms and metal-oxygen bond that is relatively more stable than the coordinate bond between the metal and the nitrogen atom of the cyano, CN, group. On the other hand, $M^2$ is a transition metal ion that has more than one stable valence form and forms a relatively strong covalent bond with the carbon atom of the CN group. An individual catalyst can contain more than one type of $M^1$ or $M^2$ metal ion in its structure. The grouping of these metals, with the cyanide ion sharing electrons with the two metal ions, usually exists in polymeric form as follows: (-M′-CN . . . M . . . NC-M′-)$_q$ where q is a number, and super 3-dimensional polymers can be formed depending on the coordination numbers of $M^1$ and $M^2$. Moreover, of those metal ions that produce active cyanide catalysts, all can coordinate with six groups. Most of the hexacyanoferrates (III), including zinc hexacyanoferrate (III), have a cubic face-centered lattice as the basic structure.

The CN- group in the catalyst is the bridging group, and can constitute all of the bridging groups in the catalyst. However, other bridging groups can be present in the catalyst so long as the catalyst contains at least a majority of CN- bridging groups. Thus, b and c are numbers and b is greater than c; c is zero when only the CN group is the bridging group. Other bridging groups are represented by X in the formula presented hereinbefore.

$M^1$ is preferably zinc (+2 or +3), aluminum (+2 or +3), iron (+3), calcium (+2) or titanium (+4), and most preferably zinc (+2 or +3). $M^2$ is preferably manganese (+2 or +3), chromium (+2 or +3), titanium (+4), cobalt (+2 or +3), molybdenum (+2 to +6) or iron (+3), and most preferably iron (+3). In the above formula a and d are preferably 2 or 3, b is preferably 5 or 6, and most preferably 6, while c is preferably 0 or 1 and most preferably 0.

Examples of catalysts which fall within the above description and which may be used are zinc hexacyanoferrate (III), zinc hexacyanoferrate (II), nickel (II), hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyano cobaltate (III), zinc hexacyano cobaltate (II), zinc hexacyanomanganate (II), zinc hexacyano chromate (III), zinc iodo pentacyanoferrate (III), cobalt (II) chloropentacyanoferrate (II), cobalt (II) bromopentacyanoferrate (II), iron (II) fluoropentacyanoferrate (III), zinc chlorobromotetracyanoferrate (III), iron (III) hexacyanoferrate (III), aluminum dichlorotetracyanoferrate (III), molybdenum (IV) bromopentacyanoferrate (III), molybdenum (VI) chloropentacyanoferrate (II), vanadium (IV) hexacyanochromate (II), vanadium (V) hexacyanoferrate (III), strontium (II) hexacyanomanganate (III), tungsten (IV) hexacyano vanadate (IV), aluminum chloropentacyano vanadate (V), tungsten (VI) hexacyanoferrate (III), manganese (II) hexacyanoferrate (II), chromium (III) hexacyanoferrate (III), and so forth. Still other cyanide complexes can be used such as Zn[Fe(CN)$_5$NO], Zn$_3$[Fe(CN)$_5$NO$_2$]$_2$, Zn[Fe(CN)$_5$CO], Zn[Fe(CN)$_5$H$_2$O], Fe[Fe(CN)$_5$OH], Cr[Fe(CN)$_5$NCO], Cr[Fe(CN)$_5$NCS], Al[Co(CN)$_5$CNO], Ni$_3$[Mn(CN)$_5$CNS]$_2$, and the like. Mixtures of these compounds can be employed.

The double metal cyanide complexes may be prepared by the process described in U.S. Pat. No. 3,278,457; U.S. Pat. No. 3,278,458; and U.S. Pat. No. 3,278,459 (all of which are incorporated herein by reference).

The catalyst is most usefully prepared by reacting a transition metal cyanide complex with a metal salt in aqueous media. Removal of a substantial amount of the water present in the catalyst is very desirable to enhance the activity of the catalyst. In order for the catalyst to be active water must be retained in the catalyst in amounts of between about 0.1 and 10 percent by weight of the catalyst. Such water is believed to be waters of hydration. In the absence of such water, the catalyst is inactive. It is believed that the water acts as an initiator for the polymerization reaction. It is preferable that the catalyst contain between 1 and 5 percent by weight of water. One way to remove most of the water and to enhance even further the activity of the catalyst is to treat it with an organic complexing or coordinating material such as an alcohol, ether, ester, sulfide, ketone, aldehyde, amide and/or nitrile.

In order to prepare a catalyst complex with high activity, the complex is prepared in the presence of the organic coordinating compound, which complexes with the double metal cyanide.

Examples of suitable organic coordinating compounds include methanol, ethanol, propanol, isopropanol, butanol, hexanol, octanol, and t-butyl alcohol; formaldehyde, acetaldehyde, propionaldehyde, butyraldehyde, isobutyraldehyde, glyoxal, benzaldehyde and tolualdehyde; and acetone, methyl ethyl ketone, 3-pentanone, 2-pentanone and 2-hexanone. Ethers such as organic cyclic polyethers are also useful. Examples of such cyclic ethers are m-dioxane, p-dioxane, trioxymethylene, paraldehyde, tetrahydrofuran and so forth. Aliphatic saturated monoethers are also useful. Examples of such ethers, such as aliphatic ethers, are ethyl ether, 1-ethoxy pentane, bis-($\beta$-chloroethyl)ether, bis-($\beta$-ethoxyethyl)ether or diglycol ether, butyl ether, ethyl propyl ether, bis-($\beta$-methoxyethyl)ether or diglyme, ethylene glycol dimethyl ether, triethylene glycol dimethyl ether, dimethoxymethane, acetal, methyl propyl ether, diethoxymethane, octaethylene glycol dimethyl ether and so forth of which the acyclic polyethers are preferred. Examples of other desirable organic coordinating agents are formamide, acetamide, propionamide, butyramide and valeramide; amyl formate, ethyl formate, n-hexyl formate, n-propyl formate, ethyl ethanoate, methyl acetate, ethyl acetate, methyl propionate, and triethylene glycol diacetate; acetonitrile, propionitrile and butyronitrile; and dimethyl sulfide, diethyl sulfide, dibutyl sulfide, dipropyl sulfide, diamyl sulfide, and so forth. Mixtures of these organic treating agents can be used. Excess of these organic treating agents which are not complexed with the catalyst, especially the high boiling compounds, can be removed by extraction with pentane, hexane and so forth. Preferred organic coordinating compounds are ethers, ketones and water.

The double metal cyanide complexes are used in catalytically effective amounts, that is, any amount which catalyzes the copolymerization of an oxirane and carbon dioxide is suitable. Preferably between about 0.1 and 10 weight percent of the complex based on the oxirane is used, and more preferably between about 2 and 4 weight percent.

The organic coordination compounds are used in amounts which enhance the catalytic activity of the double metal cyanide complexes. Preferably between about 5 and 30 percent by weight of the catalyst are used.

It is preferable to initiate the double metal cyanide complex catalyst before copolymerization. This is done by contacting the oxirane with the catalyst while mixing for up to about 45 minutes before introducing the carbon dioxide, between 10 and 15 minutes is preferred. If the initiation period is too long, the oxirane will undergo homopolymerization.

Oxiranes which may be copolymerized with $CO_2$ include those corresponding to the formula

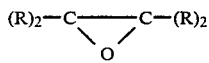

wherein

R is separately in each occurrence hydrogen, a halogen, a nitro group, a cyano group, a $C_{1-20}$ hydrocarbyl or a $C_{1-20}$ hydrocarbyl substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl or aralkylsulfonyl group; or two R's on adjacent carbon atoms may form a $C_{1-20}$ cycloaliphatic group;

R is preferably hydrogen, $C_{1-20}$ alkyl, $C_{1-20}$ alkenyl, $C_{3-20}$ cycloalkyl, $C_{1-20}$ haloalkyl, phenyl, or two R's on adjacent carbon atoms form a $C_{1-20}$ cycloalkylene group, more preferably hydrogen, $C_{1-10}$ alkyl, $C_{3-10}$ cycloalkyl, $C_{1-10}$ haloalkyl, phenyl, or two R's on adjacent carbon atoms form a $C_{3-10}$ cycloalkylene group, even more preferably hydrogen, methyl, ethyl, phenyl, halomethyl, or two R's on adjacent carbon atoms form a cyclohexyl group and most preferably hydrogen, methyl or ethyl.

Examples of desirable oxiranes include ethylene oxide, propylene oxide, butylene oxide, cyclopentene oxide, cycloheptene oxide, cyclohexene oxide, 2,3-epoxypropylphenyl ether, epichlorohydrin, epibromohydrin, and 1-butene oxide. Preferred oxiranes are ethylene oxide, propylene oxide and butylene oxide. Most preferred are propylene oxide and butylene oxide.

The oxirane and $CO_2$ can be contacted in any molar ratio which gives a copolymer. Generally an excess of carbon dioxide is used. Preferably the carbon dioxide to oxirane mole ratio is between about 1:1 and 20:1, more preferably between 5:1 and 15:1, and most preferably between about 9:1 and 11:1. Usually, the reaction vessel is pressurized with excess carbon dioxide, and the amount of carbon dioxide used depends upon the desired reaction pressure.

The copolymerization is best run in the absence of a solvent. The use of solvents may result in lower yields of products. Useful solvents include the water or polar organic solvents which coordinate with the double metal cyanide complex, for example, ketones, such as acetone, methyl ethyl ketone and the like; ethers, including cyclic ethers, such as dioxane, tetrahydrofuran and the like; and alkylene glycol ethers, such as dimethoxy glycol ether and the like.

The copolymerization reaction can be run at any temperature at which a carbon dioxide oxirane copolymer is prepared. Temperatures which are suitable are dependent upon several factors, the oxirane used, the amount of carbon dioxide present, reaction time, catalyst amount, and the desired composition of the copolymer among others. Generally desirable reaction temperatures are between 0° C. and 150° C., preferably between about 20° C. and 50° C. and more preferably between 25° C. and 35° C. Within the broadest range the copolymerization reaction occurs. Below 20° C. the reaction rate is slow and above 50° C. the amount of carbon dioxide in the polymer is low. Optimum yields occur when the temperature is between 25° C. and 35° C.

The reaction is generally run under pressure. Any inert gas or carbon dioxide can be used to pressurize the reaction. It is preferred to use excess carbon dioxide to pressurize the reaction. Any pressure at which the reaction occurs is suitable. Desirable pressure are between about 100 and 1,500 psi, preferable pressures are between 400 and 1,100, with between about 700 and 1,000 psi being most preferred. Below 400 psi, product yields are low, whereas above 1,100 psi there is no significant advantage to the use of the increased pressure. Maximum yields occur when the pressure is between 700 and 1,000 psi.

Suitable reaction times are those which give the desired yield of products. Desirable reaction times are between about 5 and 100 hours, preferably between about 24 and 48 hours.

The ratio of carbonate ether units to ether units in the copolymer can be varied by varying certain parameters. Generally as the carbon dioxide pressure increases, the ratio of carbonate ether units to ether units increases. Increasing the reaction temperature results in a lower ratio of carbonate ether units to ether units, as does the use of longer reaction times.

This compolymerization can be done in either batch or continuous reaction modes.

SPECIFIC EMBODIMENTS

The following examples are included for illustrative purposes only and do not limit the scope of the invention or the claims. All parts and percentages are by weight unless otherwise specified.

EXAMPLE 1

Synthesis of Zinc Hexacyanoferrate (III) Diglycol Methyl Ether Complex-Not an Example of the Invention A solution of potassium hexacyanoferrate (III) (17.7 g, 53.8 mmoles) in 125 ml of deionized water is added to a solution of zinc chloride (12.1 g, 88.8 mmoles) in 47 ml of water to afford an orange-yellow precipitate. Diglycol methyl ether (187 ml distilled from calcium hydride) is added to the mixture with stirring and the solution is centrifuged (19K rpm/20 min). The resulting solid is recovered and added to a 200-ml portion of 10 percent aqueous diglycol methyl ether. The solid is centrifuged and recovered and the dissolution/centrifugation process is repeated. The solid (16 g) obtained is dried in vacuo (30° C./0.5 mm) overnight and used in subsequent reactions. Infrared analysis of the catalyst indicated strong, metal-bound cyanide stretching frequencies at 2190 cm$^{-1}$ and 2115 cm$^{-1}$. A medium intensity band at 859 cm$^{-1}$ which is associated with diglycol methyl ether (methylene rocking frequency) is also noted. The elemental analysis is consistent with the formulation indicating a non-stoichiometric complex of salts and diglycol methyl ether. Found were C-26.7 percent, H-3.38 percent, and N-12.74 percent.

EXAMPLE 2

Copolymerization of Carbon Dioxide and Propylene Oxide

Propylene oxide (12.3 g, 212 mmoles) and zinc hexacyanoferrate catalyst (250 mg) are placed in a 40-ml stainless steel autoclave which contains a magnetic stirrer. The vessel is sealed under nitrogen and the contents are stirred (4–5 min). The vessel is then charged with 700 psi of carbon dioxide (maintained at this pressure for the duration of the experiment) and heated for 48 hours at 35° C. The vessel is slowly vented. A clear, semi-solid material is obtained and dissolved in 60 ml of methylene chloride. A white polymer is precipitated by adding this solution to a stirred beaker containing 300 ml of methanol. The precipitated material is devolatilized (60°/0.5 mm) to afford polypropylene carbonate (PPC) (11.0 g, 115 mmoles) which contains 14 mole percent ether linkage as determined by $^1$H nuclear magnetic resonance. The methanol-soluble fraction is stripped of solvent to give 3.3 g of viscous, clear liquid which contains propylene carbonate (2.8 g, 27 mmoles) and polypropylene oxide (0.53 g, 9.1 mmoles). The total carbonate to ether ratio is 4.8 and the conversion of propylene oxide is 71 percent. The copolymer demonstrates the following properties; Tg of 8° C.; $\eta_{inh}=0.479$ in methylene chloride (0.5 percent); $\eta_{inh}=0.342$ in benzene (0.5 percent); and Mn$=2.30\times10^4$.

EXAMPLE 3

Copolymerization of Carbon Dioxide and Ethylene Oxide

Freshly distilled ethylene oxide (12.0 g, 272 mmoles) is dissolved in 15 ml of distilled dioxane. The solution is poured into a 40-ml autoclave which contains a stir bar and 250 mg of the zinc ferricyanide catalyst. The vessel is sealed and pressurized with carbon dioxide at 720 psi at 30° C. for 84 hours with stirring. An alternating copolymer (2.8 g devolatilized) which contains 47 percent ether linkage and 53 percent carbonate linkage is obtained by precipitating the viscous solution in 200 ml of methanol. The methanol fraction is found to contain ethylene carbonate (3.0 g, 34 mmoles) and polyethylene oxide (0.4 g, 9 mmoles). The net conversion of oxirane was 31 percent with a 50 percent specificity for copolymer.

EXAMPLE 4

Copolymerization of 1-Butene Oxide and Carbon Dioxide

Distilled 1-butene oxide (12.0 g, 166 mmoles) and 250 mg of catalyst (zinc ferricyanide) are placed in the autoclave which is sealed, stirred and pressurized to 720 psi with carbon dioxide for 48 hours at 35° C. The polybut-1-ene carbonate which was recovered by the process described in Example 2 (5.1 g, 45 mmoles) contains only 6 percent ether linkage. The methanol-soluble fraction contains butylene carbonate (13 g, 11 mmoles) and polybutylene oxide (0.55 g, 7.6 mmoles). The net conversion of oxirane is 38 percent with 71 percent specificity for copolymer. The copolymer demonstrates the following properties; Tg$=4.0°$ C.; and $\eta_{inh}25°$ C.$=0.518$ in methylene chloride.

EXAMPLES 5–8

Propylene oxide and cis-cyclohexene oxide were copolymerized with carbon dioxide by the procedure outlined in Examples 2 and 4. The reaction temperatures and times, along with the product distribution and carbonate ratio are described in the table below. The table also contains the data from Examples 2 to 4.

EXAMPLE 9

Preparation of Film

Polypropylene carbonate (2.0 g), prepared by the method described in Example 2 and containing 81 percent carbonate ether units, is placed between two sheets of heavy gauge aluminum foil treated with Fluoroglide ® (trademark of Chemplast Inc.) anti-stick compound. The aluminum foil sheets are then placed between two steel sheets which are pressed between the heated platens, at 150° C., of a Carver Hydraulic Press ® (trademark of Carver) at about 9000 psi for 60 seconds. The resulting product is a clear film.

TABLE I

| Example | Oxirane | Temp (°C.) | Time (hr) | % Conversion | % Copolymer | % Specificity Cyclic Carbonate | % Polyether | Carbonate Ether Mole Ratio |
|---|---|---|---|---|---|---|---|---|
| 2 | propylene oxide | 35 | 48 | 71 | 76 | 18 | 6 | 4.8 |
| 3 | ethylene oxide | 30 | 84 | 31 | 50 | 40 | 10 | 2.0 |
| 4 | 1-butene oxide | 35 | 48 | 38 | 71 | 17 | 12 | 5.9 |
| 5 | propylene oxide | 25 | 84 | 65 | 85 | 12 | 3 | 5.4 |
| 6 | propylene oxide | 40 | 48 | 64 | 66 | 26 | 8 | 3.6 |
| 7 | propylene oxide | 80 | 24 | 55 | 0 | 64 | 36 | 1.7 |
| 8 | cis-cyclohexene oxide | 90 | 24 | 30 | 100 | 0 | 0 | — |

Reactions were conducted in 40- or 70-ml autoclave (stainless steel) at 700 to 720 psi of carbon dioxide.
All examples contained 2 percent by weight catalyst concentration.

What is claimed is:

1. A process for the preparation of a carbon dioxide oxirane copolymer wherein the process comprises contacting carbon dioxide with an oxirane in the presence of (1) an organic coordination compound and (2) a catalytic amount of a double metal cyanide complex under conditions such that an oxirane carbon dioxide copolymer is prepared.

2. The process of claim 1 wherein one of the metals of the double metal cyanide complex is chromium, manganese, iron, cobalt, zirconium, zinc, aluminun, sodium, potassium, calcium in the +2 or +3 valence state, vanadium, titanium in the +4, +5 or +6 valence state, molybdenum in the +2 to +6 valence state, or mixtures thereof; and the other metal is palladium, platinum, chromium, manganese, iron, cobalt, rhodium, ruthenium, iridium, osmium, rhenium, nickel in the +2 or +3 valence state, vanadium, titanium in the +4, +5 or +6 valence state, molybdenum in the +2 to +6 valence state, or mixtures thereof.

3. The process of claim 2 wherein the double metal cyanide complex includes those complexes which correspond to the formula $(M^1)_a[M^2(CN)_b(X)_c]_d$ wherein
- $M^1$ is chromium, manganese, iron, cobalt, zirconium, zinc, aluminum, sodium, potassium, calcium, vanadium, molybdenum, titanium or mixtures thereof;
- $M^2$ is palladium, platinum, chromium, manganese, iron, cobalt, rhodium, ruthenium, iridium, osmium, rhenium, nickel, vanadium, titanium, molybdenum or mixtures thereof;
- X is Cl, Br, I, F, $N_3$, SCN, OCN, an alkoxy or an alkoxycarbonyl group;
- a is an integer of from 1 to 3 inclusive;
- b is an integer of from 4 to 6 inclusive;
- c is an integer of from 0 to 2 inclusive; and
- d is an integer of from 1 to 3 inclusive.

4. The process of claim 3 wherein $M^1$ is zinc (+2 or +3), aluminum (+2 or +3), iron (+3), calcium (+2) or titanium (+4).

5. The process of claim 4 wherein $M^1$ is zinc (+2 or +3).

6. The process of claim 3 wherein $M^2$ is manganese (+2 or +3), chromium (+2 or +3), titanium (+4), cobalt (+2 or +3), molybdenum (+2 to +6) or iron (+3).

7. The process of claim 6 wherein $M^2$ is iron (+3).

8. The process of claim 1 wherein the oxirane corresponds to the formula

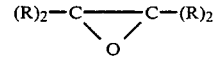

wherein
R is separately in each occurrence hydrogen, a halogen, a nitro group, a cyano group, a $C_{1-20}$ hydrocarbyl or a $C_{1-20}$ hydrocarbyl substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl or aralkylsulfonyl group; or two R's on adjacent carbon atoms may form a $C_{1-20}$ cycloaliphatic group.

9. The process of claim 8 wherein R is hydrogen, $C_{1-20}$ alkyl, $C_{1-20}$ alkenyl, $C_{3-20}$ cycloalkyl, $C_{1-20}$ haloalkyl, phenyl, or two R's on adjacent carbon atoms form a $C_{1-20}$ cycloalkylene group.

10. The process of claim 8 wherein R is hydrogen, $C_{1-10}$ alkyl, $C_{3-10}$ cycloalkyl, $C_{1-10}$ haloalkyl, phenyl, or two R's on adjacent carbon atoms form a $C_{1-10}$ cycloalkylene group.

11. The process of claim 10 wherein R is hydrogen, methyl, ethyl, phenyl, halomethyl, or two R's on adjacent carbon atoms form a cyclohexylene group.

12. The process of claim 1 wherein the organic coordination compound is an ether, ketone, aldehyde, alcohol, amide, ester, nitrile, sulfide, water, or mixtures thereof.

13. The process of claim 12 wherein the organic coordination compound is an ether, ketone or water.

14. The process of claim 1 wherein a catalytic amount of the double metal cyanide complex is between about 0.1 and 10 weight percent based upon the oxirane.

15. The process of claim 1 wherein a catalytic amount is between about 2 and 4 percent by weight.

16. The process of claim 1 wherein the amount of the organic coordination compound is between about 5 and 30 percent by weight of the oxirane.

17. The process of claim 1 wherein the temperature is between about 0° C. and 150° C.

18. The process of claim 17 wherein the temperature is between about 20° C. and 50° C.

19. The process of claim 18 wherein the temperature is between about 25° C. and 35° C.

20. The process of claim 19 wherein the pressure is between about 100 and 1500 psi.

21. The process of claim 20 wherein the pressure is between about 400 and 1100 psi.

22. The process of claim 20 wherein the pressure is between about 700 and 1000 psi.

* * * * *

UNITED STATES PATENT AND TRADEMARK OFFICE
CERTIFICATE OF CORRECTION

PATENT NO. : 4,500,704
DATED : February 19, 1985
INVENTOR(S) : William J. Kruper, Jr.
Daniel J. Swart It is certified that error appears in the above—identified patent and that said Letters Patent is hereby corrected as shown below:

In Column 3, line 44, "and" should read -- a --.

In Column 6, line 59, "pressure" should read -- pressures --.

In Column 7, line 11, "compolymerization" should read -- copolymerization --.

In Column 9, line 28, "aluminun" should read -- aluminum --.

Signed and Sealed this

Third Day of September 1985

[SEAL]

Attest:

DONALD J. QUIGG

Attesting Officer          Acting Commissioner of Patents and Trademarks - Designate